(12) United States Patent
Koh et al.

(10) Patent No.: US 8,004,596 B2
(45) Date of Patent: Aug. 23, 2011

(54) APPARATUS FOR PROCESSING A DIGITAL IMAGE TO AUTOMATICALLY SELECT A BEST IMAGE FROM A PLURALITY OF IMAGES AND METHOD OF CONTROLLING THE APPARATUS

(75) Inventors: Sung-shik Koh, Changwon (KR); Kazuhiko Sugimoto, Changwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 465 days.

(21) Appl. No.: 12/218,380

(22) Filed: Jul. 15, 2008

(65) Prior Publication Data
US 2009/0128642 A1  May 21, 2009

(30) Foreign Application Priority Data
Nov. 21, 2007  (KR) .................. 10-2007-0119295

(51) Int. Cl.
H04N 5/232 (2006.01)
G03B 13/00 (2006.01)

(52) U.S. Cl. .................. 348/345; 348/208.14

(58) Field of Classification Search .......... 348/169, 348/208.14, 345, 354
See application file for complete search history.

(56) References Cited

U.S. PATENT DOCUMENTS

| | | | |
|---|---|---|---|
| 6,342,922 B1* | 1/2002 | Mizoguchi | 348/355 |
| 7,456,874 B1* | 11/2008 | Ono | 348/239 |
| 2004/0130650 A1 | 7/2004 | Lee et al. | |
| 2005/0259175 A1 | 11/2005 | Hoshuyama | |
| 2006/0028579 A1 | 2/2006 | Sato | |
| 2006/0239672 A1 | 10/2006 | Yost et al. | |
| 2007/0076922 A1* | 4/2007 | Living et al. | 382/118 |
| 2007/0104472 A1 | 5/2007 | Quan et al. | |
| 2007/0216796 A1* | 9/2007 | Lenel et al. | 348/345 |
| 2007/0269196 A1* | 11/2007 | Misawa | 396/123 |
| 2008/0136958 A1* | 6/2008 | Nakahara | 348/345 |

FOREIGN PATENT DOCUMENTS

| | | |
|---|---|---|
| EP | 1 798 961 A1 | 6/2007 |
| JP | 2003-348429 A | 12/2003 |
| JP | 2005-284203 A | 10/2005 |
| JP | 2006-295242 A | 10/2006 |

* cited by examiner

*Primary Examiner* — Gevell Selby
(74) *Attorney, Agent, or Firm* — Drinker Biddle & Reath LLP

(57) ABSTRACT

An apparatus and appertaining method for controlling the apparatus are provided for processing a digital image, which can capture an image with reduced hand shake effect without using a hand shake sensor. The apparatus includes: an image input unit receiving a plurality of input images from the outside; and a control unit receiving the plurality of input images when a shutter-release button select signal is input from the outside, selecting a clearest image from among the input images as a best image, and capturing the best image.

16 Claims, 8 Drawing Sheets

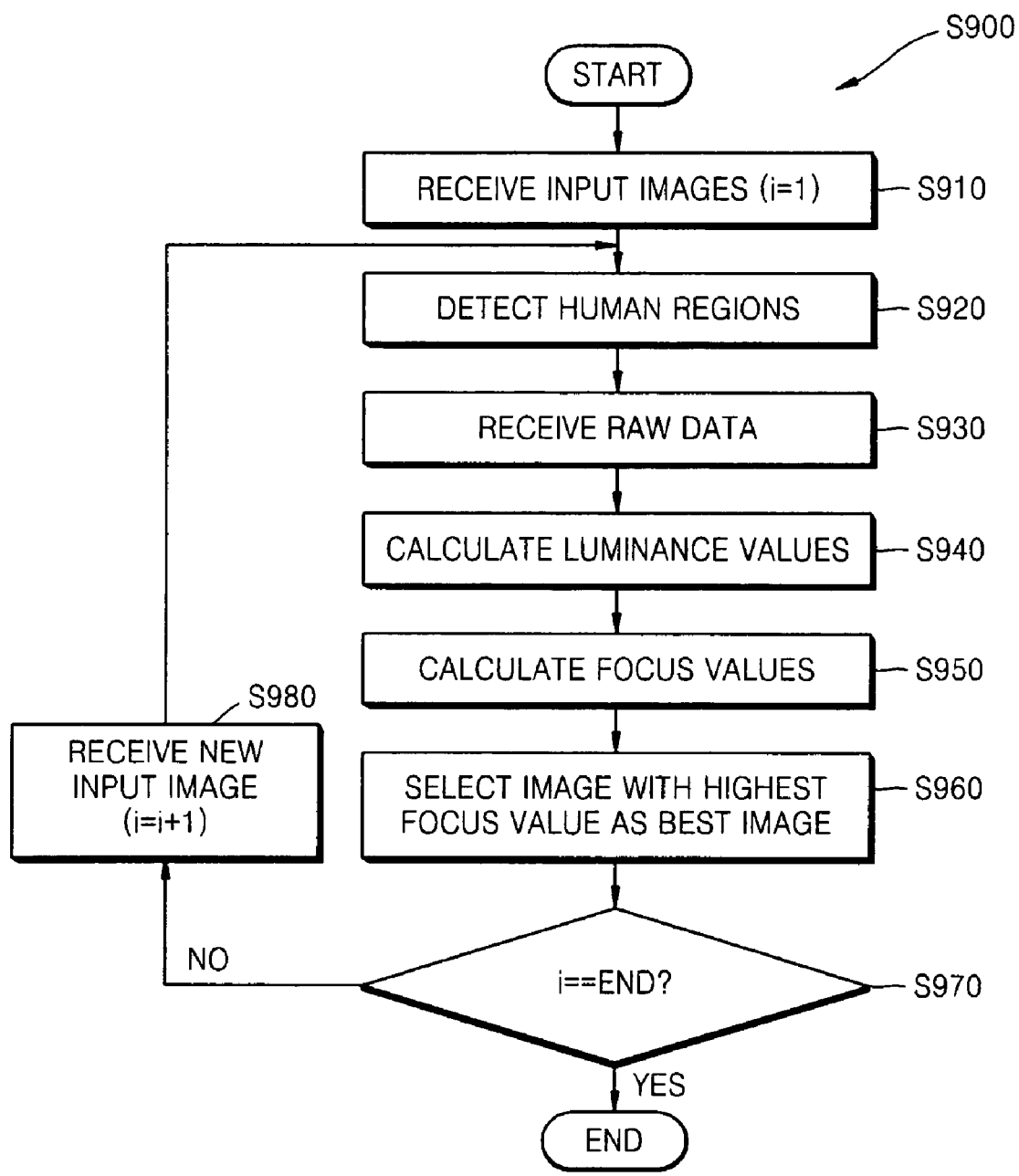

APPARATUS FOR PROCESSING A DIGITAL IMAGE TO AUTOMATICALLY SELECT A BEST IMAGE FROM A PLURALITY OF IMAGES AND METHOD OF CONTROLLING THE APPARATUS

CROSS-REFERENCE TO RELATED PATENT APPLICATION

This application claims the benefit of Korean Patent Application No. 10-2007-0119295, filed on Nov. 21, 2007, in the Korean Intellectual Property Office, the disclosure of which is incorporated herein in its entirety by reference.

BACKGROUND

1. Field of the Invention

The present invention relates to an apparatus for processing a digital image and a method of controlling the apparatus, and more particularly, to an apparatus for processing a digital image that can capture an image input through an image pickup device by pressing a shutter-release button, and a method of controlling the apparatus.

2. Description of the Related Art

In general, examples of apparatuses for processing a digital image include all devices that process images or use an image recognition sensor, such as a digital camera, a personal digital assistant (PDA), a phone camera, and a personal computer (PC) camera.

An apparatus for processing a digital image, such as a camera, can display images input through an image pickup device. When a user presses a shutter-release button, the apparatus for processing the digital image can capture a desired image and store the captured image as an image file.

When the user presses the shutter-release button, however, the apparatus for processing the digital image may be shaken due to the user's hand shake, resulting in blurry and unclear images and a failure in photographic quality.

As the apparatus for processing the digital image has recently become smaller and slimmer, the apparatus for processing the digital image has become more affected by hand shake caused when the shutter-release button is pressed. In addition, as the apparatus for processing the digital image has been developed to offer higher magnification and higher resolution, the risk of shaking the apparatus for processing the digital image due to hand shake caused when the shutter-release button is pressed has increased.

To solve the problem that a desired image cannot be captured due to hand shake caused when a user presses a shutter-release button, a hand shake sensor may be used. The hand shake sensor can measure the amount of hand shake and correct for it. However, the hand shake sensor is then additionally required.

SUMMARY

The present invention provides an apparatus for processing a digital image that can capture an image with a reduced hand shake effect without using a hand shake sensor.

Various embodiments are described below. According to an aspect of the present invention, there is provided an apparatus for processing a digital image, the apparatus comprising: an image input unit receiving a plurality of input images from the outside; and a control unit receiving the plurality of input images when a shutter-release button select signal is input from the outside, selecting a clearest image from among the input images as a best image, and capturing the best image.

The control unit may select specific regions of the input images as detection regions, and select an image with a clearest detection region as a best image.

If a person exists in each of the input images, a human region including the person may be selected as the detection region.

The shutter-release button select signal may comprise a first signal generated when a shutter-release button is pressed to a first step, and a second signal generated when the shutter-release button is pressed to a second step.

The apparatus may further comprise a focus lens moved along an optical axis in response to the first signal and receiving a plurality of focus images, wherein the focus lens is controlled by the control unit to be located at a position where a clearest focus image is obtained.

In the state where the focus lens is fixed to the position where the clearest focus image is obtained, the control unit may select the best image from among the input images in response to the second signal.

According to another aspect of the present invention, there is provided an apparatus for processing a digital image, the apparatus comprising: an image input unit receiving a plurality of input images from the outside, when a shutter-release button select signal is input from the outside; a detection region detecting unit detecting specific regions of the input images as detection regions; a raw data generating unit generating raw data of the detection regions from the input images; a luminance value calculating unit calculating luminance values corresponding to respective pixels from the raw data; a focus value calculating unit calculating focus values of the input images from the luminance values; and a best image selecting unit selecting an input image with a highest focus value among the input images as a best image.

According to another aspect of the present invention, there is provided a method of controlling an apparatus for processing a digital image, the method comprising: receiving a plurality of input images from the outside; detecting human regions of the input images as detection regions; receiving raw data of the detection regions; calculating luminance values corresponding to respective pixels from the raw data; calculating focus values of the input images from the luminance values; and selecting an input image with a highest focus value among the input images as a best image.

BRIEF DESCRIPTION OF THE DRAWINGS

The above and other features and advantages of the present invention will become more apparent by describing in detail exemplary embodiments thereof with reference to the attached drawings in which:

FIG. 9 is a flowchart illustrating a best image generating operation in the method of controlling the apparatus for processing the digital image of FIG. 5 according to an embodiment of the present invention.

DETAILED DESCRIPTION OF THE PREFERRED EMBODIMENTS

The present invention will now be described more fully with reference to the accompanying drawings, in which exemplary embodiments of the invention are shown and described below.

Figure 1:
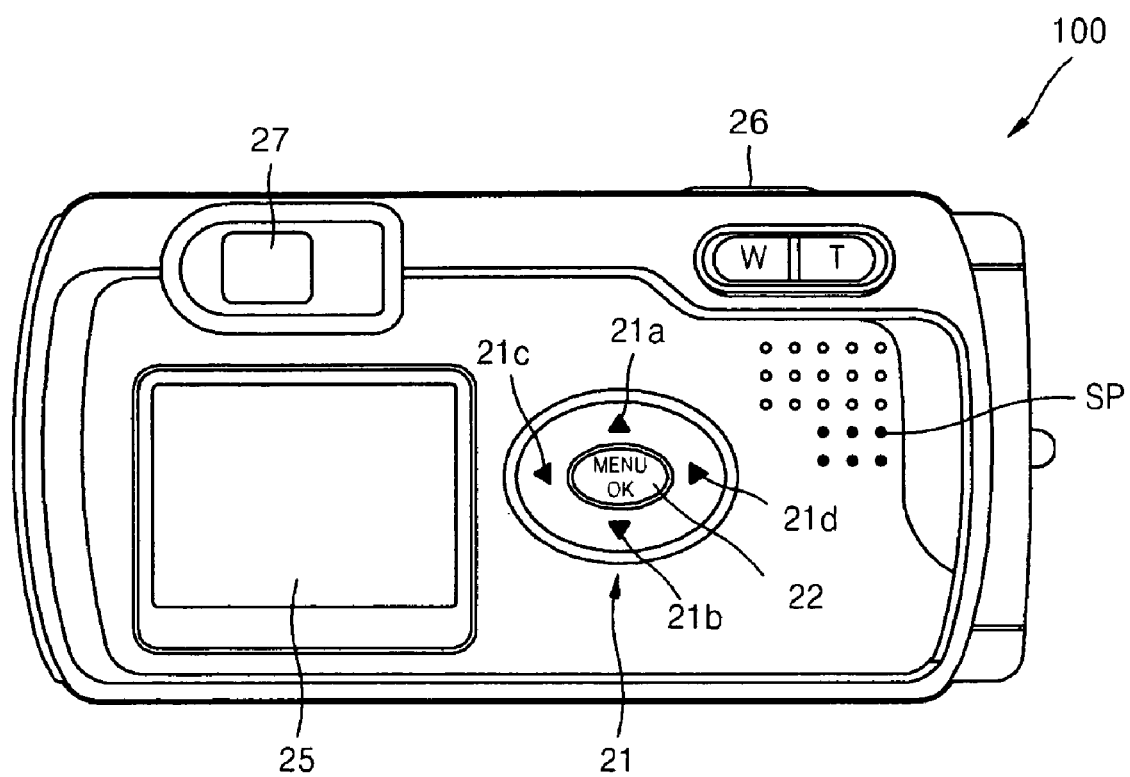
FIG. 1 is a rear view of an apparatus for processing a digital image, e.g., a digital camera, according to an embodiment of the present invention.

FIG. 1 is a rear view of an apparatus for processing a digital signal, e.g., a digital camera 100, according to an embodiment of the present invention.

Referring to FIG. 1, the digital camera 100 includes a direction button 21, a menu-OK button 22, a wide angle-zoom button W, a telephoto-zoom button T, and a display panel 25 on the back.

The direction button 21 may include an up button 21a, a down button 21b, a left button 21c, and a right button 21d. The direction button 21 and the menu-OK button 22 are pressed to execute a variety of menu items for operations of the digital camera 100.

The wide angle-zoom button W or the telephoto-zoom button T is pressed to widen or narrow the angle of view. In particular, the wide angle-zoom button W or the telephoto-zoom button T may be used to change the size of an exposed area. When the wide angle-zoom button W is pressed, the size of the selected area may be decreased, and when the telephoto-zoom button T is pressed, the size of the selected area may be increased. The display panel 25 may be an image display device such as a liquid crystal display (LCD).

The digital camera 100 may include a shutter-release button 26, a flash (not shown), a power switch (not shown), and a lens unit (not shown) on the front or the top. The digital camera 100 may further include an ocular lens and an objective lens of a view finder 27 on the front and the back.

The shutter-release button 26 opens and closes to expose an image pickup device, such as a charge coupled device (CCD), or a film to light for a predetermined period of time. The shutter-release button 26 works together with an aperture (not shown) to properly expose a photographed object and record an image on the image pickup device.

The shutter-release button 26 may be pressed to two steps. When the shutter-release button 26 is pressed to a first step, a first signal may be generated, and when the shutter-release button 26 is pressed to a second step, a second signal may be generated.

Once the first signal is input to the digital camera 100, various values for photographing and auto-focusing for setting an optimal position of a focus lens may be set. Once the second signal is input to the digital camera 100, a plurality of input images may be received in the state where the position of the focus lens is fixed, and a clearest image from among the input images may be captured and stored.

Accordingly, although the shutter-release button 26 is pressed to the second step, the clearest image from among the plurality of input images can be captured even though there is a user's hand shake. That is, the best image with the least hand shake can be captured without using a hand shake sensor.

A digital camera and a method and apparatus for controlling the same to which the present invention can be applied are disclosed in U.S. Patent Publication No. 2004/0130650, entitled "Method of Automatically Focusing Using Quadratic Function in Camera", filed by the present applicant and herein incorporated by reference. Since the disclosure of U.S. Patent Publication No. 2004/0130650 is incorporated in the specification of the present invention, a detailed explanation thereof will not be given.

Figure 2:
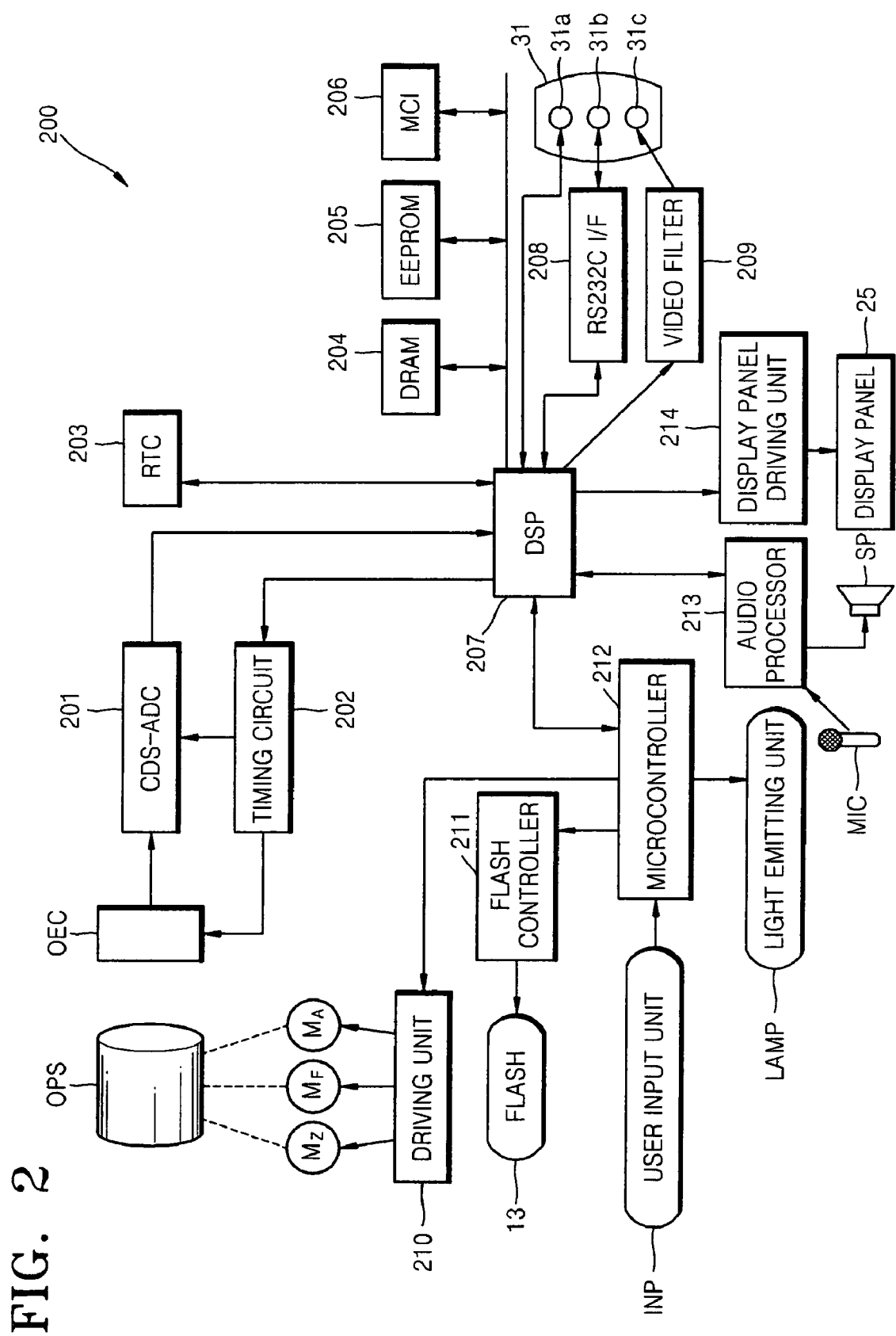
FIG. 2 is a block diagram of a control device of an apparatus for processing a digital image according to an embodiment of the present invention.

FIG. 2 is a block diagram of a control device 200 of an apparatus for processing a digital image according to an embodiment of the present invention. The control device 200 may be mounted in the digital camera 100 of FIG. 1.

Referring to FIG. 2, an optical system OPS including a lens unit and a filter unit optically processes light reflected from a photographed object. The lens unit of the optical system OPS includes a zoom lens, a focus lens, and a compensation lens. When a user presses a wide angle-zoom button W or a telephoto-zoom button T included in a user input unit INP, a corresponding signal is input to a microcontroller 212.

The microcontroller 212 controls a lens driving unit 210 in order to drive a zoom motor $M_Z$ such that the zoom lens is moved. Accordingly, when the wide angle-zoom button W is pressed, the focal length of the zoom lens is shortened and the angle of view is widened. When the telephoto-zoom button T is pressed, the focal length of the zoom lens is lengthened and the angle of view is narrowed.

In an auto-focusing mode, a main controller embedded in a digital signal processor (DSP) 207 controls the lens driving unit 210 using the microcontroller 212, to drive a focus motor $M_F$. That is, the focus motor $M_F$ is driven to move the focus lens to a position where a clearest image can be captured.

The auto-focusing mode may be actuated in response to a first signal which is generated when a shutter-release button is pressed to a first step and which is input through the user input unit INP. At this time, the focus lens is moved along an optical axis to receive a plurality of input images, and a position of the focus lens which allows a clearest image from among the plurality of input images is obtained.

Since the compensation lens compensates for an overall refractive index, the compensation lens is not separately driven. Reference numeral $M_A$ denotes a motor for driving an aperture (not shown).

An optical low pass filter included in the filter unit of the optical system OPS removes high frequency optical noise, and an infrared cut filter included in the filter unit of the optical system OPS cuts off an infrared component of incident light.

An optoelectric converting unit OEC may include an image pickup device, such as a CCD or a complementary metal-oxide-semiconductor (CMOS). The optoelectric converting unit OEC converts light output from the optical system OPS into an electrical analogue signal.

An analogue-digital converting unit may include a correlation double sampler and analogue-to-digital converter (CDS-ADC) 201. The analogue-digital converting unit processes an analogue signal output from the optoelectric converting unit OEC, removes high frequency noise, adjusts the amplitude, and converts the analogue signal into a digital signal. The DSP 207 controls a timing circuit 202 to control the operations of the optoelectric converting unit OEC and the analogue-digital converting unit 201.

A real-time clock (RTC) 203 provides time information to the DSP 207. The DSP 207 processes the digital signal output from the CDS-ADC 201 and generates a digital image signal divided into luminance (Y) and chrominance (R, G, B) signals.

A light emitting unit LAMP which is driven by the microcontroller 212 under the control of the main controller embedded in the DSP 207 may include a self-timer lamp, an automatic focus lamp, a mode indicating lamp, and a flash-ready lamp. The user input unit INP may include a direction button 21, the wide angle-zoom button W, and the telephoto-zoom button T.

The digital image signal output from the DSP 207 is temporarily stored in a dynamic random access memory (DRAM) 204. An algorithm and set data, such as a booting program and a key input program, needed for the operation of the DSP 207 is stored in an electrically erasable and programmable read only memory (EEPROM) 205. A removable memory card may be inserted into a memory card interface (MCI) 206.

The digital image signal output from the DSP 207 is input to a display panel driving unit 214, and an image is displayed on a display panel 25.

The digital image signal output from the DSP 207 may be transmitted in a serial communication through a universal serial bus (USB) connection unit 31*a*, or an RS232C interface 208 and a connection unit 31*b* thereof, or may be transmitted as a video signal through a video filter 209 and a video output unit 31*c*. The microcontroller 212 may be embedded in the DSP 207.

An audio processor 213 outputs an audio signal output from a microphone MIC to the DSP 207 or a speaker SP, and outputs an audio signal output from the DSP 207 to the speaker SP.

The control device 200 may include an image input unit and a control unit. The image input unit receives input images from the outside. The control unit captures a best image according to a shutter-release button select signal input from the outside.

The image input unit may include the optical system OPS, the optoelectric converting unit OEC, and the CDS-ADC 201. The control unit receives a plurality of input images when a shutter-release button select signal is input, selects a clearest image from among the plurality of input images as a best image, and captures the best image.

The focus lens for making focus adjustment of the input images may be included in the image input unit. The control unit may include the DSP 207 and/or the microcontroller 212.

The shutter-release button select signal may include a first signal and a second signal. The first signal is generated when the shutter-release button is pressed to a first step, and the second signal is generated when the shutter-release button is pressed to a second step.

Figure 4:
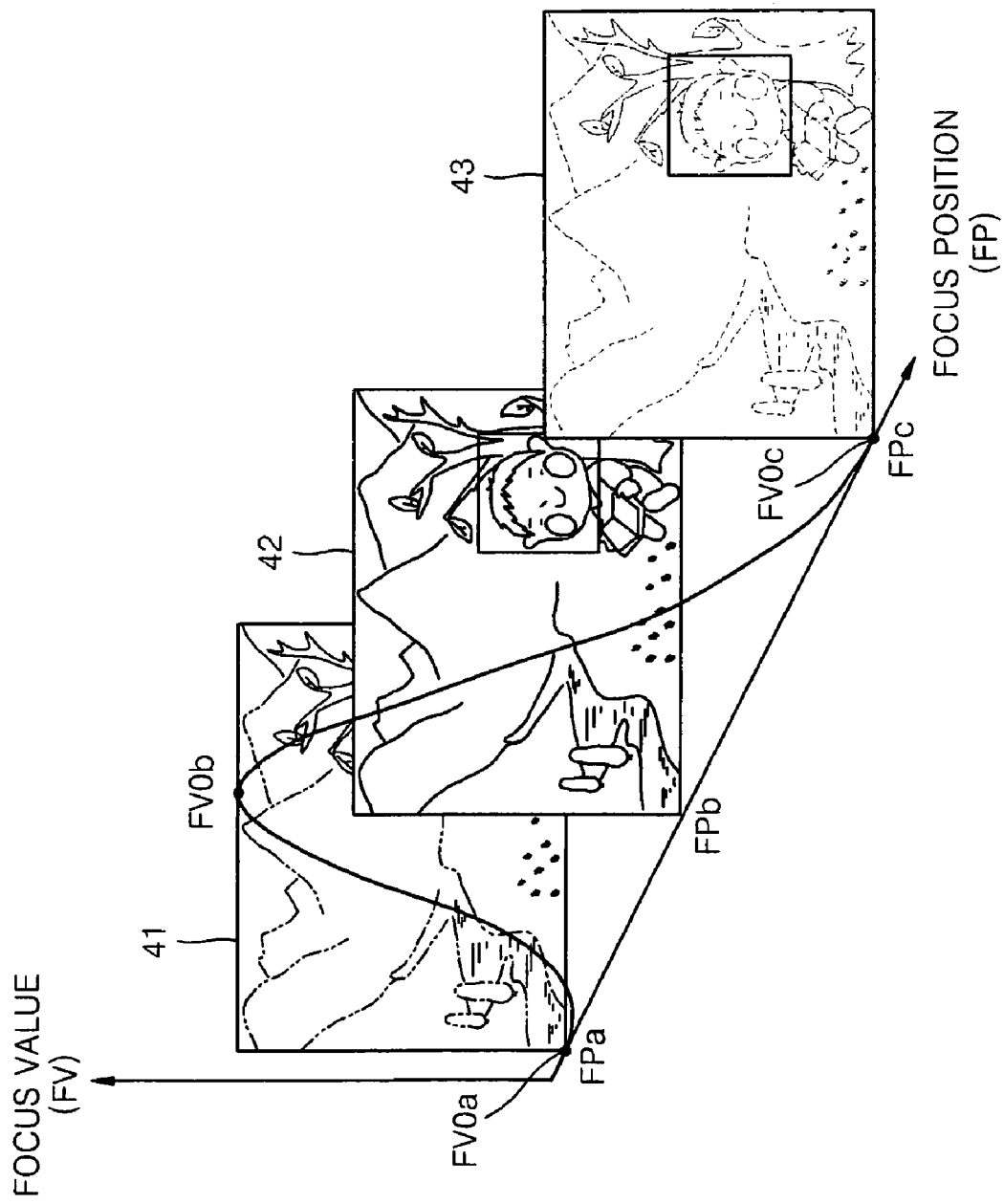
FIG. 4 is a pictorial representation that illustrates auto-focusing performed by the control device of FIG. 2 and/or FIG. 3.

FIG. 4 illustrates auto-focusing performed by the control device 200 of FIG. 2.

Input images which are received by the image input unit may be displayed as live view images on the display panel 25. In this state, if the shutter-release button is pressed to a first step, a first signal is generated, and auto-focusing is performed in response to the first signal. To this end, the focus lens is moved along an optical axis to receive a plurality of focus images 41, 42, and 43 as shown in FIG. 4.

The control unit controls the focus lens to be located at a focus position where a clearest focus image is obtained. The focus position is obtained by calculating focus values from the focus images 41, 42, and 43, and determining a position of the focus lens when a focus image with a highest focus value is input as a focus position. The focus values may be obtained by detecting face regions of the respective focus images 41, 42, and 43, detecting edges of the respective face regions, and summing up the edges. That is, a focus image with a greatest edge value may become a focus image with a highest focus value.

The focus images 41, 42, and 43 have focus values $FV0a$, $FV0b$, and $FV0c$ with respect to focus lens positions FPa, FPb, and FPc, respectively. The focus image 42 in FIG. 4 has the focus value $FV0b$ which is the highest, and the position FPb of the focus lens when the focus image 42 has the focus value $FV0b$ becomes an optimal focus position.

In general, when a person exists in a photograph, the person is often a main subject of the photograph. Since a focus position is obtained by calculating only focus values of main subject regions, not calculating focus values of all regions, a best image can be obtained in a short time.

A face region may be detected using a face region detection algorithm. For example, a region where flesh tone intensity is high may be searched for in an overall image and detected as a face region. A detection region according to the present invention is not limited to the face region, and may be a human region including a face.

When images in which a face does not exist are input, central regions of the images may be detected as focus regions and focus values of the focus regions may be calculated to obtain a clearest image.

Figure 5:
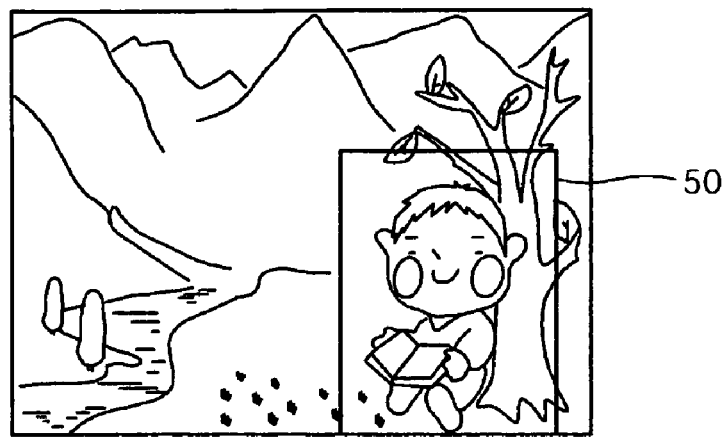
FIG. 5 is a pictorial representation that illustrates an input image input to the control device of FIG. 2 and/or FIG. 3.
Figure 6A:
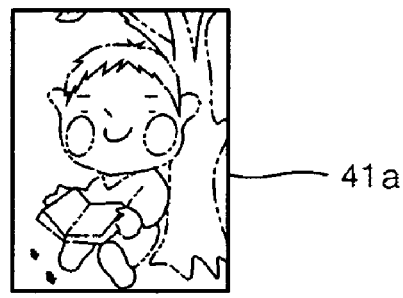
FIGS. 6A-6C are pictorial representations that illustrate human regions of input images which are continuously received in an auto-focusing mode.
Figure 6B:
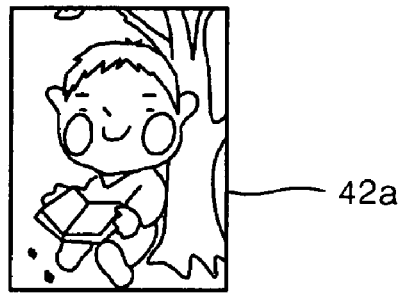
Figure 6C:
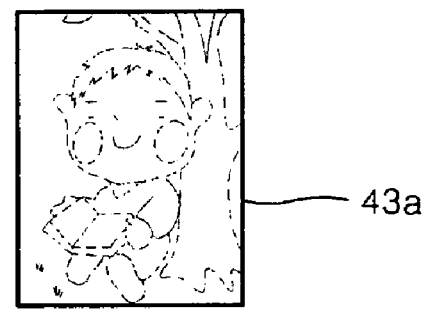
Figure 7:
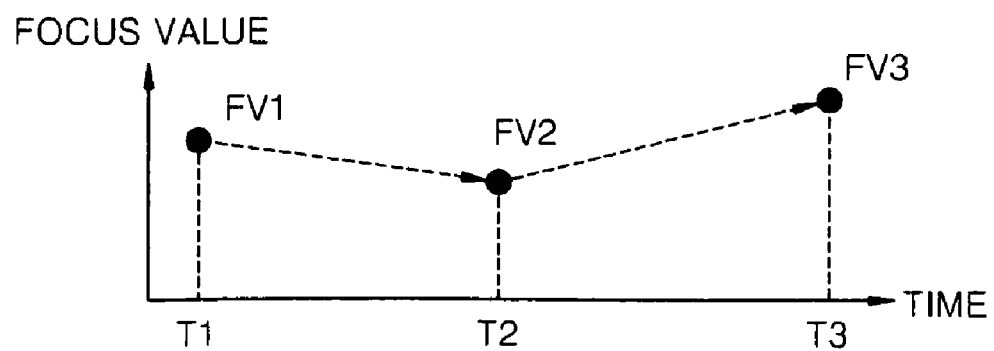
FIG. 7 is a graph illustrating focus values of the human regions of the input images of FIGS. 6A through 6C which are continuously received when a second signal is input and there is a user's hand shake.

FIG. 5 illustrates an input image input to the control device 200 of FIG. 2. FIGS. 6A through 6C illustrate human regions of input images which are continuously received in an auto-focusing mode. FIG. 7 is a graph illustrating focus values of the human regions of the input images of FIGS. 6A through 6C which are continuously received when a second signal S2 is input and there is a user's hand shake.

When the shutter-release button is pressed to a second step, a second signal is generated, and a best image with the least hand shake may be selected in response to the second signal. In the state where the focus lens is fixed to the position where a clearest image is obtained, a best image from among input images may be selected in response to the second signal.

In order to select the best image with the least hand shake, a specific region is selected as a detection region, an image with a clearest detection region among the input images may be selected as a best image. If a person exists in each of the input images, a face region or a human region 50 including the person may be selected as a detection region.

When the human region 50 is selected as a detection region as shown in FIG. 5, a face may be detected from each of the input images, a torso portion constructing the human region 50 together with the face may be traced from a position of the face, and the human region 50 may be detected and selected as a detection region. Here, a face region may be detected using a typical face region detection algorithm. For example, a region where flesh tone intensity is high is searched for in the images and detected as a face region.

If a person does not exist in each of the input images, a central region of each of the input images may be selected as a detection region. Alternatively, if a person does not exist in each of the input images, hand shake effect may be analyzed by using overall photograph information.

In general, when a person exists in a photograph, the person is often a main subject of the photograph. Since a best image with the least hand shake is selected by calculating only focus values of main subject regions, not calculating focus values of all regions, a best image can be selected in a short time.

The reliability of hand shake correction when a human region is selected as a detection region can be higher than that when only a face region is selected as a detection region. Also, high reliability of hand shake correction can be ensured even when images are input at a defocus state.

When a second signal is input, the control unit continuously receives a plurality of input images, detects human regions of the respective input images, and obtains luminance values, such as Y or G values, from raw data of the human regions. Focus values are obtained from the luminance values of the human regions of the input images, and an image with a highest focus value is selected as a best image.

The raw data may be data received through the image pickup device, such as CCD or CMOS, of the optoelectric converting unit OEC, and the luminance values may be Y or G values corresponding to respective pixels.

The focus values may be obtained by detecting edges in the human regions and summing up the edges. That is, an image with a greatest edge value in the human region becomes an image with a highest focus value among the input images, and accordingly becomes a clearest image.

The images of FIGS. 6A through 6C have focus values FV1, FV2, and FV3 as shown in FIG. 7. The focus value FV3 is the highest, and thus the input image of FIG. 6C is a clearest image and is selected as a best image. Accordingly, the input image of FIG. 6C having the focus value FV3 which is the highest becomes an image with the least hand shake.

While the focus lens is moved from the first position FPa to the third position FPc, the input images 41, 42, and 43 may be received at the positions FPa, FPb, and FPc of the focus lens, respectively. The images of FIGS. 6A through 6C may become detection regions 41a, 42a, and 43a of the input images 41, 42, and 43 from which the focus values FV0a, FV0b, and FV0c can be calculated.

Accordingly, the focus values FV0a, FV0b, and FV0c of the detection regions 41a, 41b, and 41c may be obtained, and the position FPb of the focus lens with the highest focus value may be obtained. The position FPb of the focus lens with the highest focus value allows a clearest image.

When a first signal S1 is input, by obtaining the focus values FV0a, FV0b, and FV0c of the detection regions 41a, 41b, and 41c of FIGS. 6A through 6C, the position FPb of the focus lens where the clearest image can be obtained when there is no hand shake may be obtained.

In this way, the control unit may receive a plurality of input images and set the positions of the focus lens. When a photographing start signal is input, the control unit may receive a plurality of images at preset time intervals at the positions of the focus lens, and capture and store an image with the least hand shake from among the input images.

Accordingly, when the shutter-release button 26 is pressed to a second step to take shots, a plurality of input images can be received and a clearest image can be captured even though there is a user's hand shake. That is, an optimal image with the least hand shake can be captured without using a hand shake sensor.

Since the control device 200 can capture an image with the least hand shake by pressing the shutter-release button 26 to a second step to capture and store an image, hand shake can be corrected in a short time that the user cannot recognize.

Also, a best image can be automatically selected without manipulating buttons while watching a plurality of images.

Figure 3:
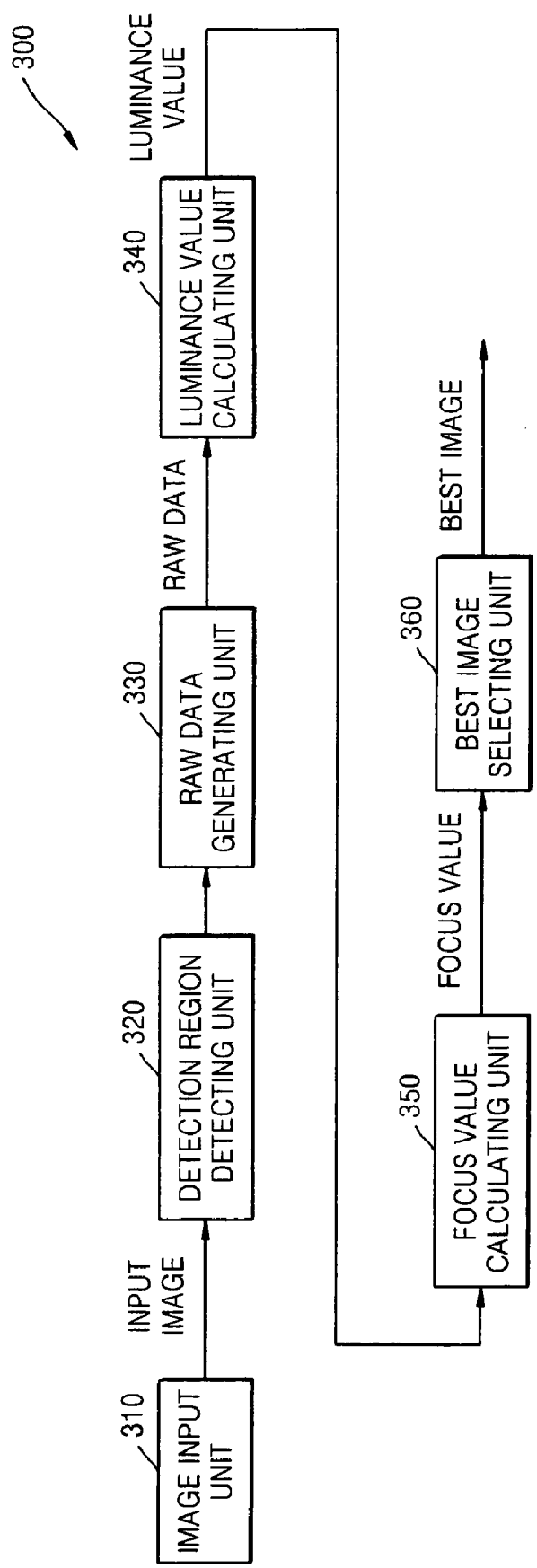
FIG. 3 is a block diagram of an apparatus for processing a digital image according to another embodiment of the present invention.

FIG. 3 is a block diagram of an apparatus 300 for processing a digital image according to another embodiment of the present invention. The apparatus 300 may use the control device 200 of FIG. 2. Also, all or some elements of the apparatus 300 may be realized in the DSP 207 and/or the microcontroller 212 of the control device FIG. 2.

Accordingly, the same description of the apparatus 300 as that of the control device 200 of FIG. 2 will not be repeated.

Referring to FIG. 3, the apparatus 300 includes an image input unit 310, a detection region detecting unit 320, a raw data generating unit 330, a luminance value calculating unit 340, a focus value calculating unit 350, and a best image selecting unit 360.

When a shutter-release button select signal is input from the outside, the image input unit 310 receives a plurality of input images from the outside. The detection region detecting unit 320 detects specific regions on the input images as detection regions. The raw data generating unit 330 generates raw data of the detection regions from the input images.

The luminance value calculating unit 340 calculates luminance values corresponding to respective pixels from the raw data. The focus value calculating unit 350 calculates focus values of the input images from the luminance values. The best image selecting unit 360 selects an input image with a highest focus value among the input images as a best image.

The shutter-release button select signal may include a first signal and a second signal. The first signal is generated when a shutter-release button is pressed to a first step, and the second signal is generated when the shutter-release button is pressed to a second step.

The apparatus 300 is moved along an optical axis in response to the first signal to receive a plurality of focus images. A focus lens that is controlled to be located at a position where a clearest image is obtained may be further included in the image input unit 310. The focus lens is controlled to be located at a position where a face region with a highest focus value is obtained by auto-focusing performed in the method of FIG. 4.

The image input unit 310 may include an optical system OPS, an optoelectric converting unit OEC, and a CDS-ADC 201. The focus lens for making focus adjustment of the input images may be included in the image input unit 310.

In the state where the focus lens is fixed to the focus position where the clearest image is obtained, the image input unit 310 sequentially receives a plurality of input images in response to a second signal. Human regions of the sequentially input images are shown in FIGS. 6A through 6C.

If a person exists in each of the input images, the detection region detecting unit 320 may select a human region 50 including the person as a detection region as shown in FIG. 5. In detail, a face may be detected from each of the input images, a torso portion constructing the human region 50 together with the face may be traced from a position of the face, and the human region 50 may be selected as a detection region.

The human regions of the plurality of input images may be the images shown in FIGS. 6A and 6C.

If a person does not exist in each of the input images, a central region of each of the input images may be selected as a detection region. Alternatively, if a person does not exist in each of the input images, hand shake effect may be analyzed by using overall photograph information.

Raw data generated by the raw data generating unit 330 may be data received through an image pickup device, such as a CCD or a CMOS, of the optoelectric converting unit OEC. The luminance value calculating unit 340 calculates luminance values such as Y or G values corresponding to pixels.

The focus value calculating unit 350 may calculate focus values FV1, FV2, and FV3 of the input images as shown in FIG. 7 from the luminance values of the input images.

In the state where the focus lens is located at the position FPb of the focus lens where the clearest photograph can be obtained when there is no hand shake, a plurality of images may be received in preset time intervals, and focus values FV1, FV2, and FV3 of the respective images may be calculated.

In FIG. 7, images are received at a first time T1, a second time T2, and a third time T3, which are preset, when the focus lens is located at the preset focus position FPb, and focus values FV1, FV2, and FV3 of the respective images are calculated.

The focus value FV3 of the image input at the third time T3 is the highest among the focus values FV1, FV2, and FV3 of the images obtained when the focus lens is located at the focus position FPb. Accordingly, the image input at the third time T3 of FIG. 6C may become an image with the least hand shake.

Figure 8:
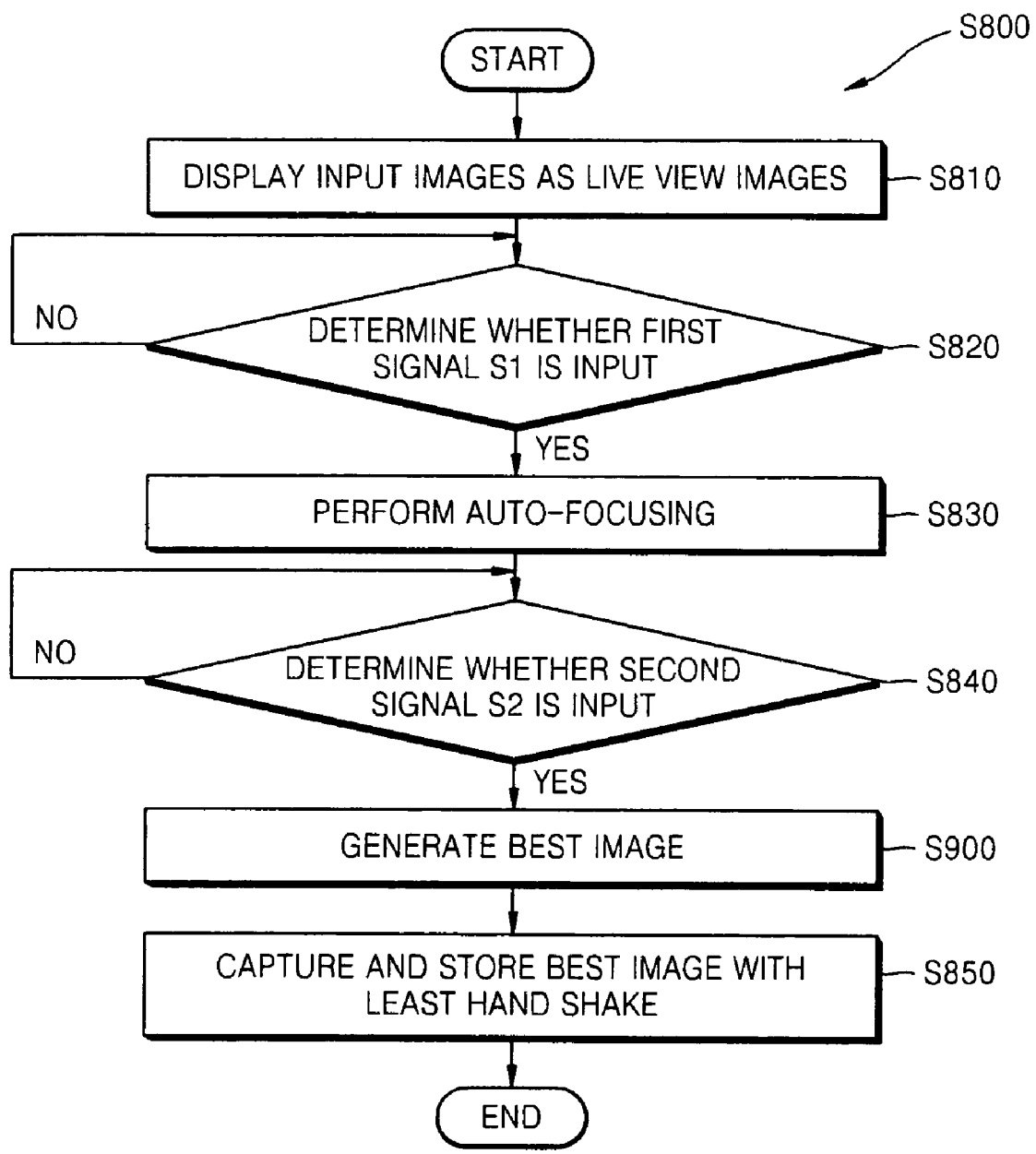
FIG. 8 is a flowchart illustrating a method of controlling an apparatus for processing a digital image according to an embodiment of the present invention.

FIG. 8 is a flowchart illustrating a method S800 of controlling an apparatus for processing a digital signal according to an embodiment of the present invention. FIG. 9 is a flowchart illustrating a best image selecting operation S900 in the method S800 of FIG. 8. The method S800 may be performed by the control device 200 and the apparatus of FIG. 2 and/or FIG. 3.

Accordingly, the same description of the method S800 as that of the control device 200 and the apparatus 300 will not be repeated.

Referring to FIG. 8, the method S800 includes displaying input images as a live view images in operation S810, performing auto-focusing in operations S820 and S830, selecting a best image in operations S840 and S900, and capturing and storing the best image in operation S850.

The method S800 may be performed in response to a shutter-release button select signal. The shutter-release button select signal may include a first signal and a second signal. The first signal is generated when a shutter-release button is pressed to a first step, and the second signal is generated when the shutter-release button is pressed to a second step.

In operation S810, input images are displayed as live view images on a display device. In operations S820 and S830, when a first signal S1 is input, a focus lens is moved along an optical axis, a plurality of focus images are received, and the focus lens is controlled to be located at a position where a clearest focus image is obtained.

In operations S840 and S900, when a second signal S2 is input, in the state where the focus lens is fixed to the position where the clearest focus image is obtained, a plurality of input images are received from the outside and a clearest image from among the plurality of input images is selected as a best image with the least hand shake.

In operation S850, the best image with the least hand shake is captured, converted and compressed into a file, and stored in a storage medium such as a memory card.

When the second signal S2 is input is operation S840, a best image generating operation S900 is performed. The best image generating operation S900 includes receiving input images in operations S910, S970, and S980, detecting human regions in operation S920, obtaining raw data in operation S930, calculating luminance values in operation S940, calculating focus values in operation S950, and selecting a best image in operation S960.

In operations S910, S970, and S980, a plurality of input images are received from the outside. In operation S920, human regions of the input images are detected as detection regions. In operation S930, raw data of the detection regions are received.

In operation S940, luminance values corresponding to respective pixels are calculated from the raw data. In operation S950, focus values of the input images are calculated from the luminance values. In operation S960, an image with a highest focus value among the input images is selected as a best image.

A predetermined number of input images are sequentially received from the outside in operations S910, S970, and S980.

Once the input images are received, human regions of the input images are detected and focus values are calculated using edge information in the human regions. Only data of an image with a highest focus value among the input images input by this time may be stored as data of a best image with the least hand shake.

However, when a focus value of a next input image is higher than that of the best image that is previously stored, the next input image is stored as an image with the least hand shake and the previously stored image is removed. Hence, since only information of the image with the least hand shake is stored, a memory space can be reduced.

The method S800 can capture an optimal image with the least hand shake without using a hand shake sensor.

As described above, the apparatus for processing the digital image and the method of controlling the apparatus according to the present invention can capture an image with reduced hand shake effect without using a hand shake sensor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. An apparatus for processing a digital image, the apparatus comprising:
   an image input unit for receiving a plurality of input images from the outside; and
   a control unit for:
      receiving a plurality of focus images when a first shutter-release button select signal is input from the outside as a focus lens moves along an optical axis, selecting a clearest image from among the focus images as a first best image, and determining a position of the focus lens for the clearest image of the focus images; and
      receiving the plurality of input images when a second shutter-release button select signal is input from the outside with the focus lens at the determined position, selecting a clearest image from among the input images as a second best image, and capturing the second best image.

2. The apparatus of claim 1, wherein the control unit selects specific regions of the input images as detection regions, and selects an image with a clearest detection region as a second best image.

3. The apparatus of claim 2, wherein, if a person exists in each of the input images, a human region including the person is selected as the detection region.

4. The apparatus of claim 3, wherein a face in each of the input images is detected, and a torso portion constructing a human region together with the face is traced from a position of the face, and the human region is detected as the detection region.

5. The apparatus of claim 2, wherein, if a person does not exist in each of the input images, a central region of each of the input images is selected as the detection region.

6. The apparatus of claim 1, wherein the shutter-release button select signal comprises the first signal generated when a shutter-release button is pressed to a first step, and the second signal generated when the shutter-release button is pressed to a second step.

7. The apparatus of claim 6, wherein the focus lens is moved along the optical axis in response to the first signal and receiving the plurality of focus images, wherein the focus lens is controlled by the control unit to be located at a position where the clearest focus image is obtained.

8. The apparatus of claim 1, wherein the receiving of the plurality of focus images is performed in a no hand shake situation, and the receiving of the plurality of input images is performed in a hand shake situation.

9. An apparatus for processing a digital image, the apparatus comprising:
   a focus lens that moves along an optical axis in response to a first shutter-release button select signal to receive a plurality of focus images, and is controlled to be located at a position where a clearest image is obtained from the plurality of focus images;
   an image input unit for receiving a plurality of input images from the outside when a second shutter-release button select signal is input from the outside while the focus lens remains at the located position;
   a detection region for detecting unit detecting specific regions of the input images as detection regions;
   a raw data generating unit for generating raw data of the detection regions from the input images;
   a luminance value calculating unit for calculating luminance values corresponding to respective pixels from the raw data;
   a focus value calculating unit for calculating focus values of the input images from the luminance values; and
   a best image selecting unit for selecting an input image with a highest focus value among the input images as a best image.

10. The apparatus of claim 9, wherein, if a person exists in each of the input images, a human region including the person is selected as the detection region, and if a person does not exist in each of the input images, a central region of each of the input images is selected as the detection region.

11. The apparatus of claim 10, wherein a face in each of the input images is detected, a torso portion constructing a human region together with the face is traced from a position of the face, and the human region is detected as the detection region.

12. The apparatus of claim 9, wherein the shutter-release button select signal comprises the first signal generated when a shutter-release button is pressed to a first step, and the second signal generated when the shutter-release button is pressed to a second step.

13. The apparatus of claim 12, wherein the image input unit receives the input images in response to the second signal.

14. A method of controlling an apparatus for processing a digital image, the method comprising:
   receiving a plurality of focus images from the outside as a focus lens moves along an optical axis;
   determining a position of the focus lens for the clearest image of the focus images;
   receiving a plurality of input images from the outside while the focus lens remains at the determined position;
   detecting human regions of the input images as detection regions;
   receiving raw data of the detection regions;
   calculating luminance values corresponding to respective pixels from the raw data;
   calculating focus values of the input images from the luminance values; and
   selecting an input image with a highest focus value among the input images as a best image.

15. The method of claim 14, further comprising:
   generating a first signal when a shutter-release button is pressed to a first step;
   generating a second signal when the shutter-release button is pressed to a second step; and
   controlling the focus lens, which is moved along the optical axis in response to the first signal to receive the plurality of focus images.

16. The method of claim 15, wherein, in the state where the focus lens is fixed to the position where the clearest focus image is obtained, the input images are received in response to the second signal.

* * * * *